(No Model.)

W. KELLEY.
ROLLER SKATE.

No. 325,937.  Patented Sept. 8, 1885.

Witnesses:
Addie Kelley,
John Kelley.

Inventor:
William Kelley,

UNITED STATES PATENT OFFICE.

WILLIAM KELLEY, OF WEST FLORENCE, OHIO, ASSIGNOR OF ONE-HALF TO MARTIN KELLEY, OF SAME PLACE.

ROLLER-SKATE.

SPECIFICATION forming part of Letters Patent No. 325,937, dated September 8, 1885.

Application filed May 20, 1885. (No model.)

*To all whom it may concern:*

Be it known that I, WILLIAM KELLEY, of West Florence, in the county of Preble and State of Ohio, have invented a new and useful Improvement in Roller-Skates, which improvement is fully set forth in the following specification and accompanying drawings, in which—

Figures 1, 2:
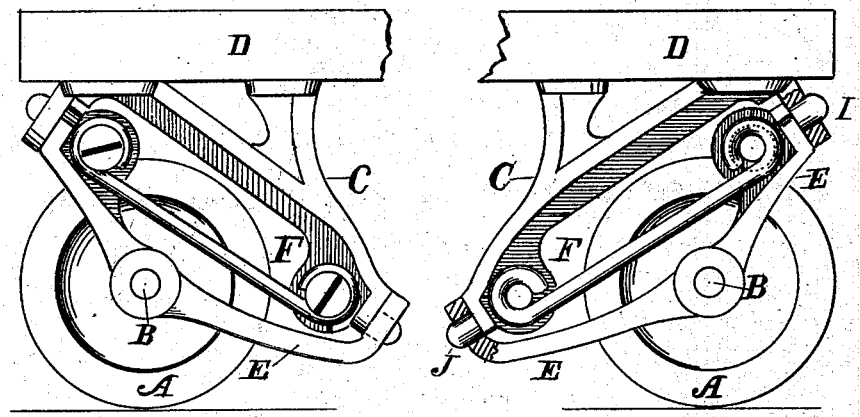
Figure 3:
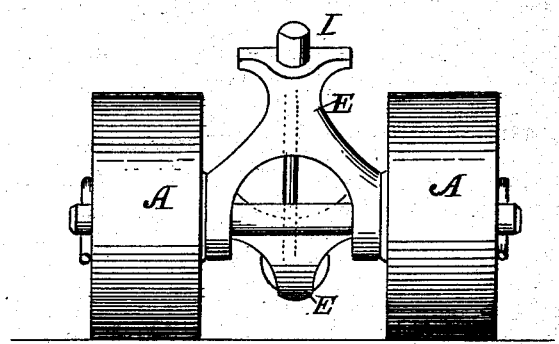

Figure 1 is a side elevation of the rear truck of the skate with one wheel detached. Fig. 2 is a longitudinal vertical section of the same, and Fig. 3 is an end elevation of the truck or wheels and frame.

My improvement consists in making a metallic spring to hold or bring the trucks back straight, either of metal with holes in ends to secure it to the hanger and roller-carrier, or with the ends bent to secure them to the same.

Similar letters refer to similar parts throughout the several views.

In Fig. 1, D is the platform or foot-piece of the skate, A is the wheel, and B the axle on which the wheel revolves.

C is the hanger or support secured to the platform of the skate, as shown in Fig. 2, having a hole at its upper portion in corresponding position to enter hole in roller-carrier E, upon which it oscillates, these bearings being constructed at an angle with the foot-piece.

F is a straight metallic spring, one end of which is secured to the hanger C, in close proximity to the lug I, and on a line between the lugs I J, and the other end of this spring is secured to roller-carrier E, near the lug I, also on a line between the said lugs I J, so that the pivotal motion of the roller-carrier and the spring will be on a straight line, and thus act quickly and evenly in case the skate-platform is moved to the right or to the left.

By the elasticity or twisting of the spring a lateral rocking motion is permitted in the foot-piece, at the will of the operator.

The truck-frame or roller-carrier E, having lug I on its upper end, has also a hole at its lower end to receive a corresponding lug on the hanger C. The sides of the truck-frame, near the middle, are bored to receive the axle of the truck upon which the wheels revolve, and constitute the bearings of the frame E of the truck, and also serve as shoulders for the ends of the wheels.

B is the axle, having the bearings in the sides of the truck-frame E, and provided with holes to receive such devices as may be required to secure the wheels.

What I claim as new is—

1. In a roller-skate, a straight spring having one end attached to the platform-carrier and the other end to the frame which carries the rollers, substantially as herein set forth.

2. In roller-skates, the platform-carrier and the roller-carrier pivoted together and having interposed the torsional springs, substantially as herein set forth.

3. In roller-skates, the platform-carrier having at one end a socket and at the other end a pivotal lug, and the roller-frame having at one end a pivotal lug and at the other end a socket, hinged together and provided with a straight or torsional spring secured to the platform-carrier and roller-frame at opposite ends on a straight line with said pivotal points, substantially as herein set forth.

4. The combination of the platform-carrier C, having at its upper end the socket and at an angle downwardly therefrom the pivotal lug J, with the roller-carrier frame E, having at its upper end the pivotal lug I, and at its lower end a socket, with the spring F, substantially as herein set forth.

5. The combination of the platform D, having the inclined carrier-frame C, having at opposite ends the lug and socket, with the roller-carrier frame having at opposite ends corresponding lug and socket, with the spring F, the whole arranged as and for the purpose substantially as herein set forth.

In testimony that I claim the foregoing I have hereunto set my hand, in the presence of witnesses.

WILLIAM KELLEY.

Witnesses:
 LIZZIE KELLEY,
 ADDIE KELLEY.